United States Patent [19]

Kratz et al.

[11] 4,191,994

[45] Mar. 4, 1980

[54] INVERTER COMPRISING AT LEAST TWO CONTROLLABLE LOAD THYRISTORS

[75] Inventors: Gerhard Kratz, Erlangen; Werner Kuehnel, Uttenreuth, both of Fed. Rep. of Germany

[73] Assignee: Siemens Aktiengesellschaft, Berlin & Munich, Fed. Rep. of Germany

[21] Appl. No.: 943,068

[22] Filed: Sep. 18, 1978

[30] Foreign Application Priority Data

Oct. 13, 1977 [DE] Fed. Rep. of Germany ....... 2746115

[51] Int. Cl.² ............................................. H02M 7/515
[52] U.S. Cl. ..................................... 363/135; 363/138
[58] Field of Search ........................... 363/96, 135–139

[56] References Cited

U.S. PATENT DOCUMENTS

| | | | |
|---|---|---|---|
| 3,207,974 | 9/1965 | McMurray | 363/136 |
| 3,249,844 | 5/1966 | Jensen | 363/139 |
| 3,391,328 | 7/1968 | Mokrytzki | 363/135 |

*Primary Examiner*—William M. Shoop
*Attorney, Agent, or Firm*—Hill, Van Santen, Steadman, Chiara & Simpson

[57] ABSTRACT

The disclosure relates to an inverter comprising at least two controllable load thyristors. One diode each is connected in antiparallel fashion with each load thyristor, which diode is a component of a commutation installation for the corresponding load thyristor. The commutation installation manifests two LC-series oscillatory circuits, which are dimensioned for two different load currents. There is present for each LC-series oscillatory circuit one pair each of commutation thyristors. The two commutation thyristors of one of the two pairs, respectively, are alternately ignited such that, during the commutation of the load thyristors the commutation current can flow in a low impedance circuit.

2 Claims, 2 Drawing Figures

INVERTER COMPRISING AT LEAST TWO CONTROLLABLE LOAD THYRISTORS

BACKGROUND OF THE INVENTION

The invention relates to an inverter comprising at least two controllable load thyristors to which a control device is connected which alternately switches them on for the purpose of alternate connection of a load to the terminals of a d.c. voltage source, wherein there is connected, in antiparallel fashion, with each load thyristor, one diode each which is a component of a commutation installation for the corresponding load thyristor, which commutation installation manifests an LC-series oscillatory (or resonant) circuit dimensioned for a specified load current, and which manifests, for each load thyristor, a controllable commutation thyristor connected to the control device, whereby each commutation thyristor forms a closed circuit with the LC-series oscillatory circuit and its diode, such that the energy of the LC-series oscillatory circuit, during commutation, in each instance changes over to a low-impedance (or low-ohmic) commutation path which is free of the load and the d.c. voltage source.

SUMMARY OF THE INVENTION

The invention proceeds from the fact that the maximum load current for an inverter of the type shown in German Auslegeschrift No. 1,438,446 is only necessary for a brief period of time; namely, for the preparation of x-ray photographs, and that when the components of the inverter are dimensioned only for this short-term operation, a more inexpensive construction is possible than when the components are dimensioned for continuous operation. In this connection, it must be noted that the current in the commutation circuit is always of equal magnitude, independently of the magnitude of the respective load current, given a constant voltage of the d.c. voltage source, and that said current corresponds to the maximum load current for which the inverter must be dimensioned.

The object underlying the invention consists in constructing an inverter of the type initially cited such that only components need be provided for the maximum load current which are dimensioned for short-term operation but not for continuous operation.

This object is achieved in accordance with the invention by virtue of the fact that an additional LC-series oscillatory circuit is present, dimensioned for a second load current, to which switching means are connected which connect it, instead of the first LC-series oscillatory circuit, into the commutation installation. In the case of the inventive inverter, the second LC-series oscillatory circuit can be dimensioned corresponding to a lower maximum load current; for example, in x-ray technology, corresponding to the load current during fluoroscopy, such that the maximum commutation current is likewise substantially smaller. For continuous operation during fluoroscopy, this second LC-series oscillatory circuit can then be connected into the inverter circuit instead of the first LC-series oscillatory circuit which corresponds to a high load current for x-ray photographs. The maximum commutation current is thereby substantially reduced, and all components, particularly the commutation thyristors for the maximum load current during an x-ray photograph, and the free-running diodes, need be dimensioned only for short-term operations.

A circuit-wise construction of an inverter according to the invention consists in that the second LC-series oscillatory circuit, together with one, in each instance, of two additional commutation thyristors dimensioned for the second load current, and together with one each of the diodes, forms a closed circuit, and that the control device is constructed such that, in addition to the load thyristors, for the purpose of commutation either the commutation thyristors of the first LC-oscillatory circuit or the commutation thyristors of the second LC-oscillatory circuit are alternately ignitable. In this further development, the switching-on of the respectively ignited LC-oscillatory circuit proceeds via corresponding commutation thyristors. It is also conceivable within the framework of the invention to subsequently equip a known inverter with additional LC-series oscillatory circuits corresponding to different load currents.

The invention shall be explained in further detail in the following on the basis of a sample embodiment illustrated in FIG. 2 of the drawings; and other objects, features and advantages will be apparent from this detailed disclosure and from the appended claims.

DETAILED DESCRIPTION

Figure 1:
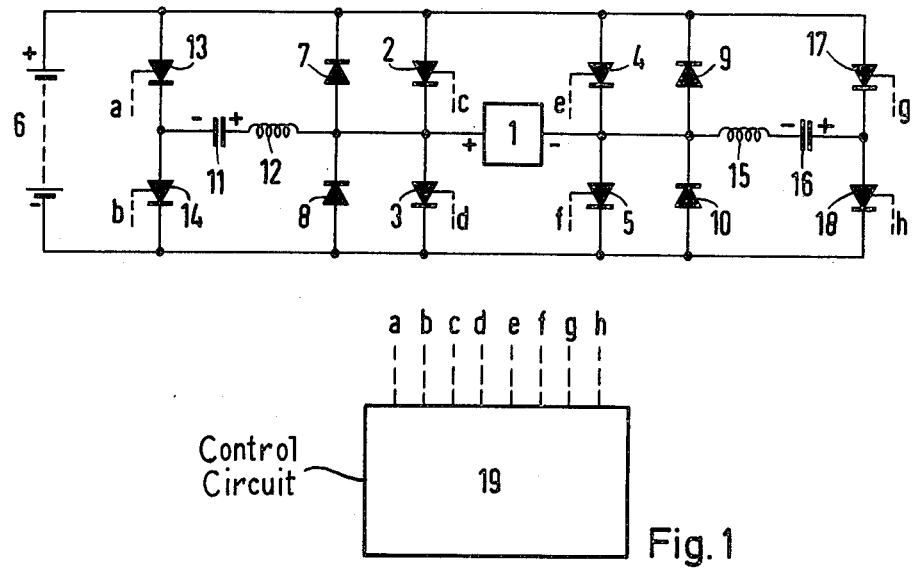
FIG. 1 illustrates an inverter of a type known from German Auslegeschrift No. 1 438 446.

In FIG. 1, an inverter known from the German Auslegeschrift No. 1 438 446 is illustrated. It exhibits a load 1 which is disposed in the one diagonal of a bridge consisting of load thyristors 2 through 5. The other diagonal of this bridge is connected to a d.c. voltage source 6. One diode 7 through 10 is in each instance connected in an antiparallel fashion to each load thyristor 2 through 5, said respective diode being a component of a commutation installation for the corresponding load thyristor. In order to effect commutation of load thyristors 2 and 3, there is present an LC-series oscillatory circuit 11, 12, which is connected to a connection point of diodes 7 and 8, on the one hand, and to the connection point of two commutation thyristors 13 and 14, on the other hand. Analogously thereto, for the purpose of commutation of load thyristors 4 and 5, an LC-series oscillatory circuit 15, 16, is connected between the connection point of diodes 9 and and 10 and the connection point of two commutation thyristors 17 and 18. The load thyristors 2 through 5 and the commutation thyristors 13, 14, 17, 18, are connected to a common control device 19.

In order to explain the method of operation of the inverter according to FIG. 1, let it be initially assumed that capacitors 11 and 16 of the LC-series oscillatory circuits 11, 12 and 15, 16, are charged with the indicated polarities and that the load thyristors 2 and 5 are ignited via the control device 19. The load 1 is thereby connected to the voltage source 6 with the indicated polarities. In order to reverse the polarity of the voltage at load 1, load thyristors 2 and 5 must be quenched (or extinguished) and the load thyristors 3 and 4 must be ignited. To this end, an ignition pulse is initially delivered to the commutation thyristors 13 and 18 via control device 19. Subsequent to ignition of the commutation thyristors 13 and 18, the capacitors 11 and 16 are reversed in charge; that is first via load 1 and d.c. voltage source 6. The charge reversal current here replaces the current flowing through load thyristors 2 and 5. Since the load current through load 1 is constant, load thyristors 2 and 5 thus are quenched. Following the quenching of these thyristors, the charge reversal current flows further via diodes 7 and 10 until capacitors 11 and 16 are charged to a voltage having the opposite polarity of the voltage illustrated in FIG. 1. Following termination of the charge reversal operation, commutation thyristors 13 and 18 are extinguished (or quenched).

Briefly prior to this, load thyristors 3 and 4 may be ignited by means of control device 19 through the delivery of ignition pulses. In order to extinguish (or quench) load thyristors 3 and 4, commutation thyristors 14 and 17 are ignited, whereby the capacitors 11 and 16 again undergo a charge reversal corresponding to the above-described method of operation. In so doing, load thyristors 3, 4, are extinguished (or quenched). Subsequently, load thyristors 2 and 5 are again ignited, etc. In the case of the inverter according to FIG. 1, the LC-series oscillatory circuits must be dimensioned corresponding to the load current, since they must, of course, take over (or assume) the latter for a brief period. There are areas of application for an inverter of this type wherein the load current is not constant. Such an area (or field) of application is, for example, x-ray technology. In this technology, an inverter according to FIG. 1 can serve the purpose of feeding the high voltage transformer of an x-ray generator. In this instance, the d.c. voltage source 6 may either be a mains (or power) rectifier or an accumulator. The feeding of the high voltage transformer can proceed with a frequency lying substantially above the mains (or supply) frequency, such that the high voltage transformer, in comparison with x-ray generators directly fed by the mains supply, can be provided with a substantially lighter weight and smaller construction. In the case of this application, a plurality of load currents occur. In particular, high load currents are required for the preparation of x-ray photographs, whereas comparatively low load currents are required for x-ray fluoroscopy; i.e., for continuous operation, since the x-ray tube power is substantially smaller during fluoroscopy than during the taking of an x-ray photograph. If the inverter according to FIG. 1 is to be provided for this type of application, the LC-series oscillatory circuits 11, 12, and 15, 16, are to be dimensioned corresponding to the maximum load current, for the maximum commutation current is dependent upon the maximum load current. Accordingly, the quenching thyristors 13, 14, 17, 18, and the free-running diodes 7, 8, 9, 10, are to be dimensioned corresponding to the maximum load current.

Figure 2:
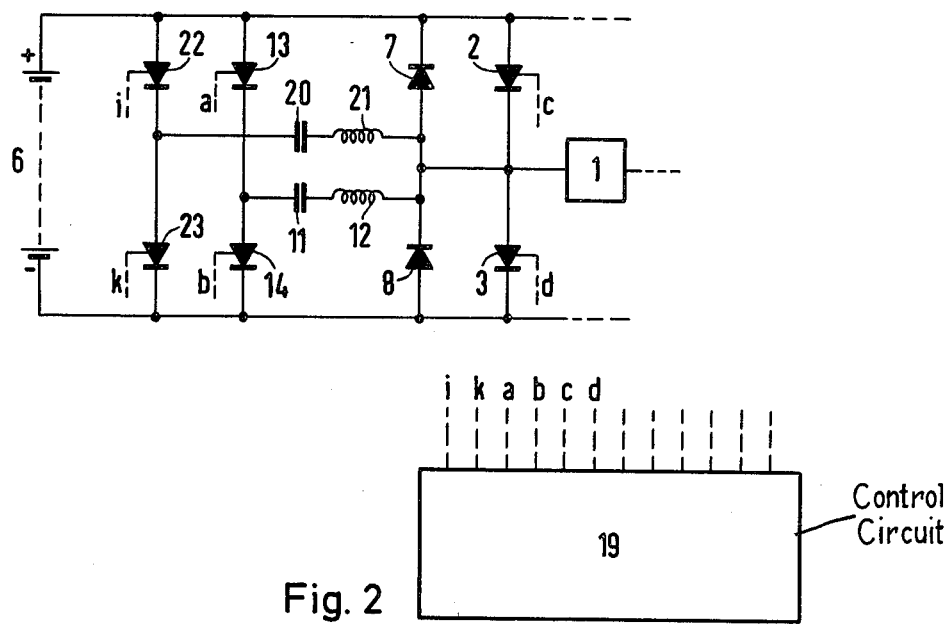
FIG. 2 shows modifications of the embodiment of FIG. 1 in accordance with the teachings of the present invention.

In FIG. 2, only the left phase-module of an inverter in a bridge circuit is illustrated. Those components corresponding to the components of FIG. 1 are referenced with the same reference signs. The LC-series oscillatory circuit 11, 12 is dimensioned for a first load current which is comparatively high. This load current, however, is to occur only briefly, such that the commutation thyristors 13 and 14, as well as the free-running diodes 7 and 8, need be dimensioned only for short-term operation corresponding to the maximum commutation current. For continuous operation, a second, lower load current is provided. A second LC-series oscillatory circuit 20, 21 is dimensioned corresponding to the second lower load current, which LC-oscillatory circuit is connected to the connection point of free-running diodes 7, 8, on the one hand, and to the connection points of two additional commutation thyristors 22 and 23, on the other hand. Corresponding to the particular selected load current, either commutation thyristors 13, 14, or the commutation thyristors 22, 23 are alternately ignited for the purpose of commutation of load thyristors 2, 3. In the case of the high load current, an alternate ignition of commutation thyristors 13, 14, takes place, and in the case of a low load current, an alternate ignition of commutation thyristors 22, 23 takes place. In the case of a low load current, the maximum commutation current is also low, corresponding to the dimensioning of the LC-series oscillatory circuit 20, 21, such that the free-running diodes 7, 8, are also subjected to a lower maximum commutation current than in the case of a high load current which, however, only occurs briefly. In the case of the low load current occurring for a long period of time, a maximum commutation current flows through commutation thyristors 22, 23, which maximum commutation current is lower than in the case of the high load current, and said commutation thyristors 22, 23, can be dimensioned corresponding to this lower maximum commutation current.

The right phase module of the inverter corresponds in its construction to the left phase module illustrated in FIG. 2; i.e., there is present, in addition to the LC-series oscillatory circuit 15, 16, a second LC-series oscillatory circuit dimensioned for a lower load current, and there are present, in addition to the commutation thyristors 17, 18, two additional commutation thyristors corresponding to a lower maximum commutation current.

By way of summary, it is apparent that, in the case of the illustrated inverter according to the invention, the free-running diodes 7 through 10 and the commutation thyristors 13, 14, 17, 18, need only be dimensioned for short-term operation when the maximum load current occurs only briefly, and that there takes place a correspondingly lower loading of the free-running diodes 7 through 10 for continuous operation with a lower load current, and that additional commutation thyristors are present which are dimensioned corresponding to the lower maximum commutation current.

The invention is described in conjunction with an inverter in a bridge circuit. However, it is basically also applicable in the case of an inverter wherein only a single phase module corresponding to FIG. 2 is present if the d.c. voltage source 6 has a center tap to which the right end of load 1 is connected. In this instance, naturally, only two LC-series oscillatory circuits are then present for two different load currents in the case of the inventive inverter. It is also conceivable within the scope of the invention, in the case of an inverter of this type, to provide three, four, five, etc., LC-series oscillatory circuits corresponding to three, four, five, etc. different load currents, or, in the case of an inverter in a bridge circuit according to FIG. 2, to provide six, eight, ten, etc., series oscillatory circuits corresponding to three, four, five, etc., different load currents. It is also conceivable to provide three phase modules for the generation of a three-phase medium (or mean) frequency network.

It will be apparent that many modifications and variations may be effected without departing from the scope of the novel concepts and teachings of the present invention.

We claim as our invention:

1. An inverter comprising at least two controllable load thyristors to which a control device is connected which alternately switches them on for the purpose of alternate connection of a load to the poles of a d.c. voltage source, wherein one diode each is connected in antiparallel fashion to each load thyristor, said diode being a component of a commutation installation for the corresponding load thyristor which commutation installation manifests an LC-series oscillatory circuit dimensioned for a specified load current and a controllable commutation thyristor, connected to the control device, for each load thyristor, whereby each commutation thyristor forms a closed circuit with the LC-series oscillatory circuit and its diode, such that the energy of the LC-series oscillatory circuit, during commutation, in each instance swings over to a low-impedance commutation path which is free of the load and the d.c. voltage source, characterized in that an additional LC-series oscillatory circuit (20, 21), dimensioned for a second load current, is present, to which switching means (22, 23) are connected which connect the latter into the commutation installation (7, 8, 11 through 14, 20 through 23), instead of the first-mentioned LC-series oscillatory circuit (11, 12).

2. An inverter according to claim 1, characterized in that the second LC-series oscillatory circuit (20, 21), together with one each of two additional commutation thyristors (22, 23), dimensioned for the second load current, and one each of the diodes (7, 8), forms a closed circuit, and that the control device (19) is constructed such that, in addition to the load thyristors (2, 3) either the commutation thyristors (13, 14) of the first LC-series oscillatory circuit (11, 12) are alternately ignitable for the purpose of commutation, or the commutation thyristors (22, 23) of the second LC-series oscillatory circuit (20, 21) are alternately ignitable for the purpose of commutation.

* * * * *